United States Patent
Kjos et al.

(10) Patent No.: US 7,613,847 B2
(45) Date of Patent: Nov. 3, 2009

(54) PARTIALLY VIRTUALIZING AN I/O DEVICE FOR USE BY VIRTUAL MACHINES

(75) Inventors: Todd J. Kjos, Cupertino, CA (US); Jonathan K. Ross, Bellevue, WA (US); Christophe De Dinechin, Sophia-Antipolis (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 224 days.

(21) Appl. No.: 11/435,831

(22) Filed: May 16, 2006

(65) Prior Publication Data

US 2008/0005297 A1 Jan. 3, 2008

(51) Int. Cl.
G06F 13/28 (2006.01)
G06F 21/00 (2006.01)

(52) U.S. Cl. ............................. 710/22; 711/6
(58) Field of Classification Search ............ 710/22
See application file for complete search history.

(56) References Cited

U.S. PATENT DOCUMENTS

| | | | |
|---|---|---|---|
| 4,792,896 A * | 12/1988 | Maclean et al. ............ 703/25 |
| 6,519,645 B2 | 2/2003 | Markos et al. |
| 2005/0076186 A1* | 4/2005 | Traut ........................ 712/1 |
| 2005/0080982 A1 | 4/2005 | Vasilevsky et al. |
| 2005/0091365 A1 | 4/2005 | Lowell et al. |
| 2005/0120160 A1 | 6/2005 | Plouffe et al. |
| 2005/0246453 A1 | 11/2005 | Erlingsson et al. |
| 2005/0289246 A1 | 12/2005 | Easton et al. |
| 2006/0146057 A1* | 7/2006 | Blythe ...................... 345/506 |

* cited by examiner

Primary Examiner—Henry W. H. Tsai
Assistant Examiner—Juanito C Borromeo (57) ABSTRACT

A computer system comprises a physical computer and a virtual machine monitor executable on the physical computer and configured to create an emulation of at least one guest operating system adapted to control the physical computer. The computer system further comprises a host executable on the physical computer that manages physical resources coupled to the physical computer on behalf of the virtual machine monitor and the at least one guest operating system. The host is adapted to virtualize a Peripheral Component Interconnect (PCI) configuration address space whereby the at least one guest operating system controls PCI input/output (I/O) devices directly and in absence of I/O emulation.

12 Claims, 8 Drawing Sheets

PARTIALLY VIRTUALIZING AN I/O DEVICE FOR USE BY VIRTUAL MACHINES

BACKGROUND

In many data centers, information technology (IT) resources such as processors and memory are bound to specific business functions and cannot be easily reallocated as new requirements are imposed or business climates change. Overall central processing unit (CPU) utilization of less than 30% in a data center is common as an administrator may provision resources to handle peak workloads. If resources can be dynamically migrated to workloads according to usage rather than by static assignment, IT administrators can attain better utilization of IT hardware. Utilization can translate directly to profitability. Available hardware can be reassigned to follow business requirements.

Server virtualization technologies can be used to enable an IT environment to evolve in response to business needs. A virtual server environment can be implemented to support system partitioning, availability, utility pricing, and resource management, enhancing the dynamic capabilities of a server environment.

SUMMARY

An embodiment of a computer system comprises a physical computer and a virtual machine monitor executable on the physical computer and configured to create an emulation of at least one guest operating system adapted to control the physical computer. The computer system further comprises a host executable on the physical computer that manages physical resources coupled to the physical computer on behalf of the virtual machine monitor and the at least one guest operating system. The host is adapted to virtualize a Peripheral Component Interconnect (PCI) configuration address space whereby at least one guest operating system controls PCI input/output (I/O) devices directly and in absence of input/output emulation for memory-mapped I/O registers and I/O port registers, and emulates accesses to PCI configuration space.

BRIEF DESCRIPTION OF THE DRAWINGS

Embodiments of the invention relating to both structure and method of operation may best be understood by referring to the following description and accompanying drawings.

DETAILED DESCRIPTION

A computer system is configured to support virtual machine technology and a software-controlled virtual computer comprising multiple virtual central processing units (CPUs), virtual memory, and virtual I/O devices. Virtualization enables multiple operating systems, or "guests" to run concurrently on the same "host" physical machine. For example, multiple instances of HP-UX and Linux can run on the same machine at the same time in separate virtual computers sharing the hardware resources such as CPUs and I/O devices, enabling very flexible partitioning and optimizing system hardware utilization.

Some configurations may implement only virtual I/O so that all I/O devices are completely virtualized, maximizing virtual machine flexibility with respect to physical I/O resources sharing or allocation. However for some workloads, the additional software execution required to emulate the behavior of I/O devices introduces unacceptable overheads. In addition, systems that operate with virtual I/O alone do not enable guest operating system visibility to underlying hardware technology, limiting the types of devices that can effectively be used within virtual machines. To address overhead and visibility concerns and attain other benefits of flexible operations, a feature called "Direct I/O" may be implemented which enables virtual machines to directly control I/O devices. Direct I/O reduces or minimizes the device emulation overhead and allows guest operating systems to control devices for which no emulation software exists, enabling guest access to I/O hardware technology without requiring support from the virtual machine monitor.

Figure 1:
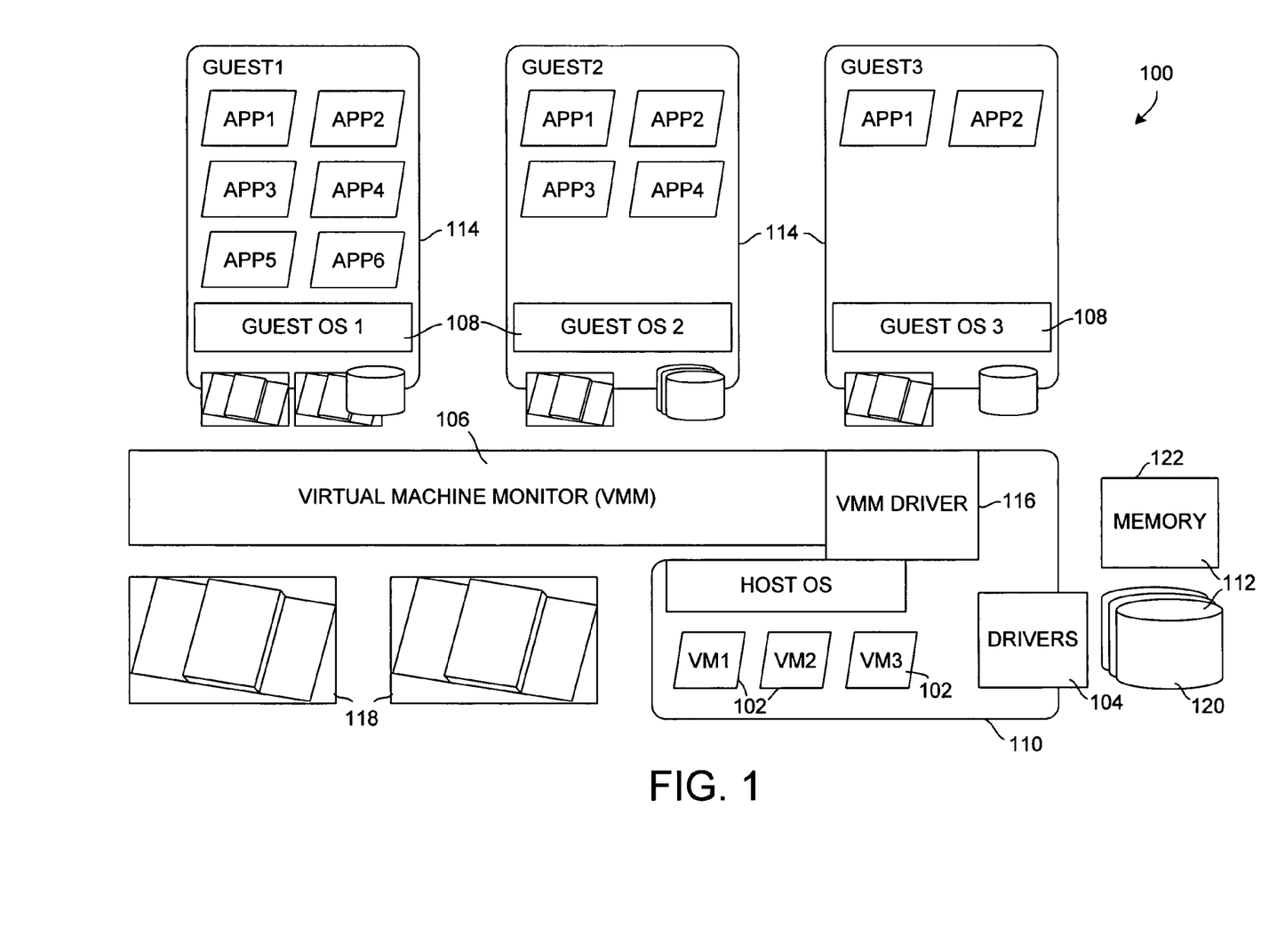
FIG. 1 is a schematic block diagram illustrating an embodiment of a computer system which is adapted to partially virtualize an I/O device for use by virtual machines.

Referring to FIG. 1, a schematic block diagram illustrates an embodiment of a computer system 100 adapted to partially virtualize an input/output device for use by virtual machines 114. The illustrative computer system 100 comprises a physical computer 104 and a virtual machine monitor 106 which is executable on the physical computer 104 and configured to emulate a complete computer system for one or more guest operating systems 108 adapted to control the physical computer 104. The computer system 100 further comprises a host 110 which is executable on the physical computer 104 and manages physical resources 112 on behalf of the virtual machine monitor 106 and the guest operating systems 108. The host 110 can virtualize a Peripheral Component Interconnect (PCI) configuration address space whereby a guest operating system 108 controls PCI I/O devices directly and in absence of I/O emulation software for memory-mapped I/O registers and I/O port registers, and emulates accesses to PCI configuration space.

Multiple guest operating systems 108 can be configured so that different functions of a multifunction PCI card are allocated to different guest operating systems 108. Typically, the guest operating systems 108 and associated guest drivers pre-exist, whereby guest operating systems are operational with direct I/O without modification, so that interactions with I/O functionality, including virtual and direct I/O functionality, cannot be modified.

Virtual machines (VM) 114 can share CPUs 118, I/O devices 120, or physical memory 122. Each VM still contains a complete operating system image, called a guest operating system. Faults, malicious code or planned software downtimes are contained within a single VM. A guest operating system crash or hang doesn't affect other guests on the same system. Since the virtual machines appear to the guests as complete computer systems with industry standard firmware and I/O, no special support is required in the guest operating system to run in a virtual machine. To ensure that service level objectives are met, the virtual machine monitor (VMM) automatically senses the load of the guests and dynamically adjusts resource allocation.

In a virtual machine architecture, CPUs, disks and networking cards are shared among guests, thereby reducing overall system cost. One drawback of virtual machine (VM)

technology is the additional software overhead incurred to emulate specific functions of the processor and I/O hardware. Flexibility of sub-CPU granularity and I/O sharing are realized because the virtualization technology creates the illusion that the guest controls whole CPUs and real I/O hardware, for example by intercepting some actions taken by the guest and running software to emulate the expected behavior. If the guest runs a workload that frequently triggers emulation, more overhead is introduced. Worst case conditions are typically I/O intensive workloads because the emulation of an I/O controller can significantly expand the number of instructions used to perform an I/O transaction.

If a customer workload is I/O intensive, overheads may be sufficiently high that virtual machine technology becomes inappropriate for the intended application.

The virtual machine architecture comprises two main components: the Virtual Machine Monitor (VMM) 106 and the host 110. The VMM 106 creates for a guest operating system 108 the illusion that the guest 108 is in control of a physical computer 104 but has no information relating to underlying physical hardware. The host 110 runs on the physical computer 104 and manages physical resources 112 on behalf of the virtual machine monitor 106 and associated guests 114. The virtual machine monitor 106 and host 110 interact via a pseudo-device driver, called the VMM driver 116 using a message-passing protocol. Guests 114 appear to the host 110 to be normal applications, instances of a particular program called a VM application 102. The VM application 102 and the VMM driver 116 cooperate to implement I/O emulation. A host assigns resources to virtual machines by assignment to associated VM applications. When the host 110 schedules a thread corresponding to a guest 114 to run on a CPU, the virtual machine monitor 106 takes complete control of the CPU and enables the guest 114 to run. In some implementations, a guest operating system 108 runs with a lowered privilege, typically a privilege level insufficient to manage physical resources 112 in the system 100. When the guest operating system 108 attempts to perform a privileged operation, the virtual machine monitor 106 is invoked and emulates the behavior for the guest 114. Some processors may include virtualization hooks that allow the virtual machine monitor 106 to run the guest operating system 108 at the most privileged level but in a "virtualized mode" in which the virtual machine monitor 106 is invoked when the guest 114 attempts a privileged operation.

For a virtual machine 114, the physical address closely resembles the address space of a physical computer 122. Memory extends from address 0 up to the maximum defined for that virtual machine 114 with a hole between 2 GB and 4 GB for memory-mapped I/O. The virtual machine monitor 106 manages the address space by virtualizing guest physical addresses (GPAs) so that a physical address from the perspective of the guest is actually mapped to a completely different host physical address. The guest operating system 108 manages guest physical address space and the host 110 manages host physical address space. The virtual machine monitor 106 tracks the relation of GPA and HPA addresses. As in a physical computer, device drivers in a guest operating system 108 control devices by using load and store instructions to specific physical addresses that map to the control registers of the corresponding I/O devices, a device access model known as memory-mapped I/O (MMIO). Some processor instruction sets such as x86 include special IN/OUT instructions to access I/O device registers. The I/O registers are typically called I/O ports. I/O ports are emulated in the same way as MMIO so that any references to MMIO herein can be considered to also relate to port I/O. For virtualized devices, the virtual machine monitor 106 emulates the behavior of the physical device in response to MMIO loads and stores, so that a device driver running in a guest 114 operates in the manner of controlling a physical device, when in fact no actual device is operated upon. When an I/O transaction completes, the virtual machine signals the guest operating system 108 by delivering an external interrupt, just as on a physical system.

Direct I/O architecture can be used to enable guest operating systems to completely control I/O devices without usage of I/O emulation software. For example, the various different functions of multifunction PCI cards can be allocated to different guests. Management software can ensure that a particular PCI device or function is controlled by a single entity—either the host or one of the guests, enabling guests to attain access to any new I/O technology without the need for device emulation software to be written and installed.

Figure 2:
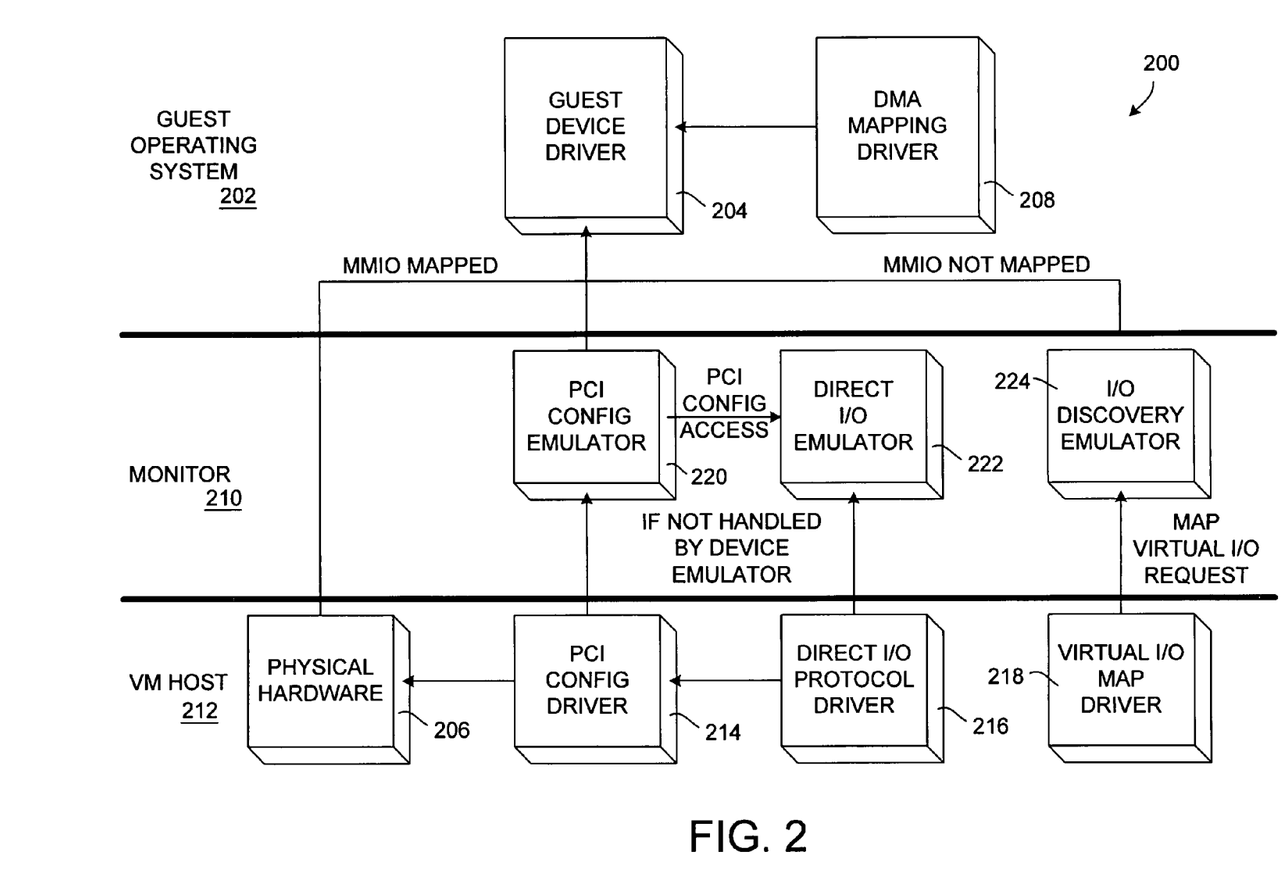
FIG. 2 is a schematic block diagram showing an embodiment of a direct I/O architecture that is suitable for usage in the computer system depicted in FIG. 1.

Referring to FIG. 2, a schematic block diagram illustrates an embodiment of a direct I/O architecture 200 that is suitable for usage in the computer system 100 depicted in FIG. 1. In some embodiments, the guest operating system 202 can comprise a guest device driver 204 configured to control particular Peripheral Component Interconnect (PCI) devices 206 and a direct memory access (DMA) mapping driver 208. The DMA mapping driver 208 makes system calls to the virtual machine monitor 210 to convert guest physical addresses to host physical addresses for selected direct memory access. The DMA mapping driver 208 also can export DMA mapping services used by the guest device driver 204 to convert guest-physical address ranges to host-physical address ranges. An embodiment of the direct I/O architecture 200 includes the virtual machine monitor 210 and host 212 that operate in combination as a hypervisor that fully emulates PCI configuration space and allows a guest to access memory-mapped input/output space directly.

Figure 3:
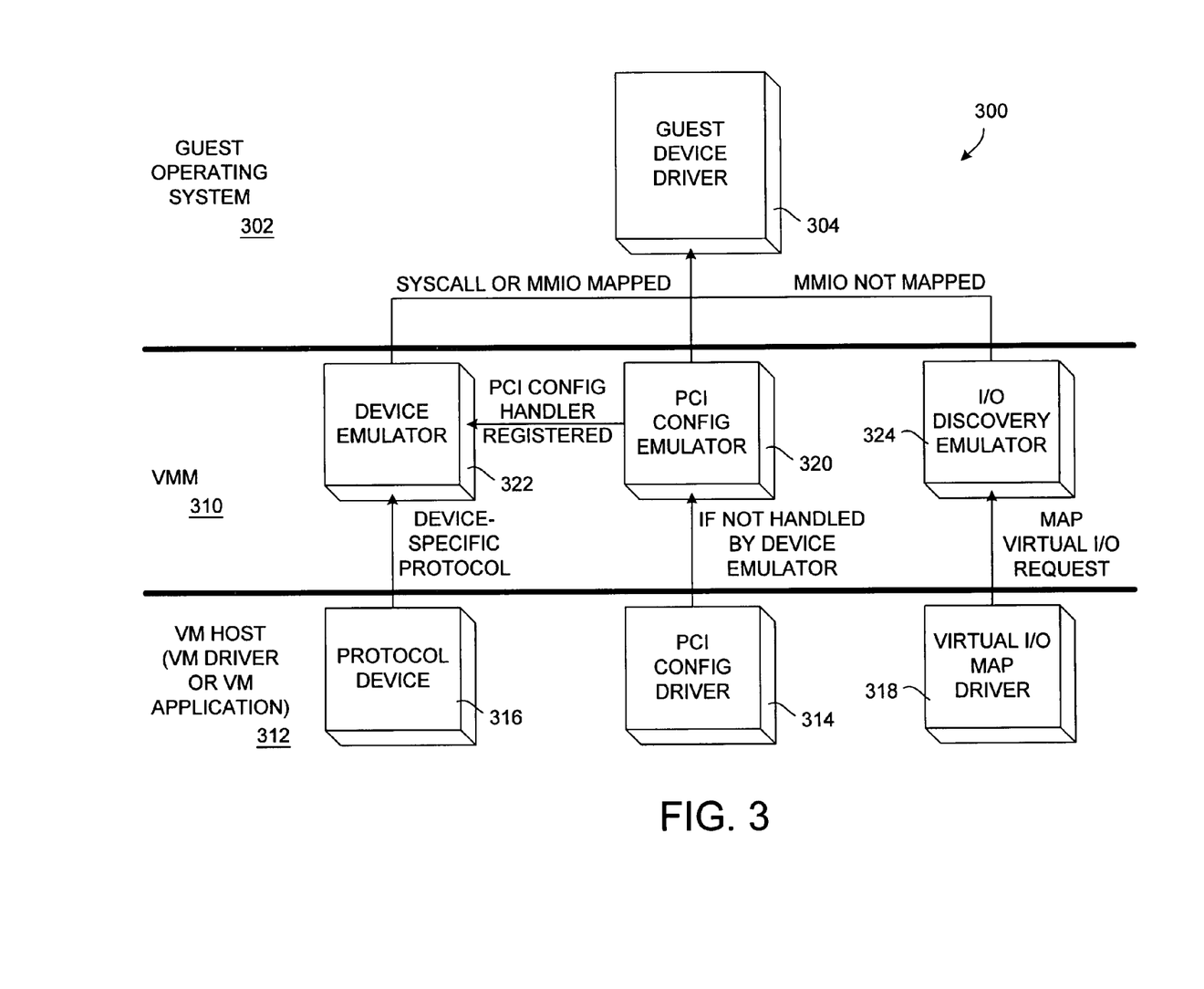
FIG. 3 is a schematic block diagram illustrating an embodiment of a virtualized I/O architecture that is suitable for usage in the computer system depicted in FIG. 1.

Direct I/O architecture 200 includes physical hardware 206 that replaces a device emulator and protocol driver in a virtualized architecture, for example virtualized architecture 300 depicted in FIG. 3. The Direct I/O architecture 200 eliminates the overhead associated with emulation of the device, although some overhead associated with delivery of interrupts remains.

Many I/O devices use direct memory access to move data to or from memory. Operating System Kernel device drivers program DMA by specifying a set of target addresses, usually physical addresses, and bytes to transfer at each address. Because I/O devices have no notion of guest physical addresses, the DMA Mapping Driver 208 translates the GPAs to host physical addresses (HPAs) which are supported by the hardware.

Without special hardware, direct I/O can be supported only for guest operating systems that support DMA Mapping Drivers 208. The DMA Mapping Driver 208 makes system calls to the Virtual Machine Monitor 210 to convert GPAs to HPAs which are suitable for DMA operations. In some cases, memory ranges can be divided or arranged into a contiguous condition both on the host and on the guest. If hardware exists in the system to map guest physical addresses to host physical addresses, then no DMA driver is needed in the guest.

If a system does not have hardware-enforced isolation of I/O devices, a guest operating system using the direct I/O feature can read or write memory that is owned by the protocol manager or other guests so isolation between guests is compromised, which may be unacceptable for some users or for some applications. If unacceptable, some implementations may include address translation and isolation features that enable the DMA Mapping Driver 208 to be omitted.

In the illustrative embodiment, a virtual machine host 212 can comprise a PCI configuration driver 214, a direct I/O protocol driver 216, and a virtual I/O map driver 218. The PCI configuration driver 214 tracks PCI configuration state for individual hardware devices 206 and manages a message signaled interrupt (MSI) configuration. The direct I/O protocol driver 216 performs an interrupt service that forwards an external interrupt to the guest operating system 202 using parameters set by the guest operating system 202. The virtual I/O map driver 218 associates a device emulator with a virtual device.

The direct I/O protocol driver 216 interacts with a virtual machine direct I/O driver (vmdio), the I/O Discovery Emulator 224, and the Direct I/O Emulator 222 for device configuration and interrupt delivery.

The host controls the host physical address space, so that guests are not typically allowed to program the actual memory-mapped I/O addresses to which a device can respond. When the guest programs the base MMIO address for a device into a PCI Configuration Base Address Register (BAR), the PCI Configuration Driver 214 tracks the guest's settings but does not modify the actual BAR settings in hardware. When the guest attempts to access the MMIO address range for the first time, the Virtual I/O Map Driver 218 attempts to find the device associated with the given GPA and, upon finding the value in a virtual BAR register, creates a mapping between the guest's address and the value in the physical BAR register of the device. Thus, independent of guest operation, the emulation substitutes the GPA with the HPA for the device.

Once configured, the guest can then access the device's control registers in MMIO space via load and store operations while having no notification of the occurrence of the address translation. The guest device driver communicates with the device directly, in the manner of implementation without a virtual machine. Neither the virtual machine monitor nor the host participates in the interaction between the guest's device driver and the I/O device. Other architected PCI functionality such as message signaled interrupts can be remapped using a similar functionality.

When the device signals an interrupt using the parameters set by the host, either the virtual machine monitor or host may be in control of the physical CPU that receives the interrupt signal. If the host has control, a special device driver installed in the host operating system supplies an interrupt service routine that forwards the external interrupt to the guest using the parameters set by the guest. If the virtual machine monitor has control, then the VMM External Interrupt Emulator forwards the interrupt to the guest. In either case, the guest receives the interrupt signal exactly in the manner of a non-virtual machine implementation.

In some embodiments, the virtual machine direct I/O driver operates to claim physical devices 206 in the host operating system on behalf of the guest operating systems 202 and forward physical device interrupts to the direct I/O protocol driver 216. The direct I/O protocol driver 216 can register itself with the host OS enabling a claim of ownership to a selected PCI device, and can also initialize an interrupt for the claimed physical device to invoke the direct I/O protocol driver 216 for interrupts generated by the claimed physical device. The virtual machine direct I/O driver handles interrupts generated by a direct I/O device by sending a message to the VMM 210 which can invoke the interrupt controller emulation software to deliver the interrupt to the guest.

The direct I/O protocol driver 216 also can manage a userspace portion of device configuration including validating configuration file information and guest physical address space to PCI Configuration Base Address Register (BAR) conversion. The direct I/O protocol driver 216 can manage configuration file statements associated with a direct I/O functionality including actions of opening a specified direct I/O device file, obtaining a configuration function pointer, obtaining current PCI configuration state for the specified physical device, and initializes a virtual PCI configuration.

In some embodiments, the direct I/O protocol driver 216 can be configured to manage PCI configuration space emulation, forward interrupts from a physical hardware device to the PCI configuration emulator in the virtual machine monitor, and reset the physical hardware device on guest termination via PCI power management extensions. For example, the direct I/O protocol driver 216 can reset the physical hardware device on guest termination by use of a device-specific code whereby the direct I/O protocol driver maintains a reset function table for all devices with a defined device-specific reset function using PCI vendor identifier and device identifier as lookup parameters for determining a PCI configuration address that is used to perform a function level reset.

In some implementations, the virtual machine monitor 210 can comprise a PCI configuration emulator 220, a direct I/O emulator 222, and an I/O discovery emulator 224. The PCI configuration emulator 220 can call a function registered by a corresponding device emulator to manage configuration space accesses or forward a configuration space access to a PCI configuration driver 214 for unregistered or selectively non-emulated functions. The direct I/O emulator 222 manages direct I/O functionality in the virtual machine monitor. The I/O discovery emulator 224 determines whether an I/O device exists at an address corresponding to a guest access at a physical address that does not correspond to memory by sending a message to a virtual I/O map driver in the host 212.

The direct I/O emulator 222 functions within the virtual machine monitor 210 and interacts with the I/O Discovery Emulator 224, the PCI Configuration Emulator 220, and the Direct I/O Protocol Driver 216 for device configuration and interrupt delivery. The Direct I/O Emulator 222 can be configured to manage all PCI configuration accesses from the guest operating system 202, for example by implementing a DMA map interface and exporting an unmap interface used to indicate to the virtual machine 210 that a buffer is no longer in use for direct memory access. The PCI Configuration Emulator 220 is similar to an emulator in a fully virtualized I/O system but includes some modifications to facilitate direct I/O handling.

Referring to FIG. 3, a schematic block diagram illustrates an embodiment of a virtualized I/O architecture 300 that is suitable for usage in the computer system 100 depicted in FIG. 1. The high-level architecture for I/O virtualization 300 includes a virtual machine monitor 310 and host 312.

The virtual machine monitor 310 functions during I/O virtualization to convert from device semantics visible to the guest to an I/O message protocol informative to the virtual machine monitor 310 and to I/O requests informative to the host 312. The host 312 actually performs the I/O operations on behalf of the guest and notifies the virtual machine monitor 310 when operations are complete. The virtual machine monitor 310 can then deliver an interrupt to the guest if appropriate. Only the host 312 has access to information relating to system physical topology. Only the virtual machine application which runs in the context of the host 312 has information relating to topology of the virtual machine. Messages pass between the virtual machine 310, the VMM driver in the host 312, and the VM application in the host 312 to initialize virtual devices and to access physical I/O devices on behalf of the guest. Since the VMM is in a different address-space than the host 312, passing VM Host (VM driver or VM application) messages between the VMM and host 312 also involves a context switch. In some cases, messages are sent all the way to the host application that corresponds to the guest.

The virtualized architecture 300 has multiple components including a guest device driver 304, a device emulator 322, a PCI configuration driver 314, a PCI configuration emulator 320, and I/O Discovery Emulator 324, a Virtual I/O Map driver 318, Protocol Driver 316. The guest operating system 302 has device drivers 304 which can control particular hardware devices. The VMM emulates a limited number of devices, and only corresponding guest device drivers 304 are used. Device emulators 322 for the VMM implement semantics of individual device control registers. Device emulators 322 have no information relating to the physical device that is mapped to the virtual device. Instead the device emulators 322 convert from the device register interface to a message protocol that can be operated upon by one of the host's Protocol Drivers 316. For example, the monitor's LSI MPT SCSI Controller Emulator converts between the MPT register interface and message protocols expected by the host 312.

When a guest performs a PCI Configuration Space access via an architected firmware call or other mechanism, the PCI Configuration Emulator 320 calls a function which is registered by the corresponding Device Emulator 322 to handle configuration space accesses. If no function is registered or the handler opts not to emulate the call, then the access is forwarded by sending a message to the PCI Configuration Driver 314. The first time the guest accesses a physical address that does not correspond to memory, the I/O Discovery Emulator 324 is invoked to determine whether an I/O device exists at the designated address. Since the virtual machine monitor 310 has no information relating to the I/O topology of the virtual machine, the virtual machine monitor 310 sends a message to the Virtual I/O Map driver 318, a part of the virtual machine which resides in the host. The driver 318 responds with a message indicating which emulator should be used for the virtual device. The I/O Discovery Emulator 324 then initializes the corresponding device emulator 324. Future accesses directed to the designated address are handled by the device emulator 322. The process efficiently allocates emulation resources to support guest operations.

The host executes Virtual Machine Protocol Drivers 316 that handle device-specific requests from the Device Emulators 322 and invoke the appropriate host services or drivers to satisfy the request. Protocol Drivers 316 can exist either in the kernel space or user space of the host. Kernel-space examples include Small Computer System Interface (SCSI) and Local Area Network (LAN) device. User-space examples include Universal Asynchronous Receiver/Transmitter (UART) and real-time clock. If the Protocol Driver 316 does not have sufficient information to handle a protocol, the driver 316 passes the protocol to the Virtual Machine application. For example, a SCSI Device Emulator receives ioSCSI messages from a device emulator and uses the SCSI pass-through interface in the host operating system to pass the request to the underlying drivers in the host.

The definition of the virtual machine PCI space comes from a configuration file that is used to launch the virtual machine. Therefore PCI configuration space requests that are not handled by device emulators 322 are passed to the PCI Configuration Driver 314 in the virtual machine application. The PCI Configuration Driver 314 tracks the PCI configuration state for each device. PCI standards such as the configuration header and message signaled interrupt configuration are handled by the PCI Configuration driver 314.

A device discovery message sent by the I/O Discovery Emulator 322 is received by the host which passes the message to the Virtual I/O Map Driver 318 in the virtual machine application. The application uses the information from the virtual machine definition to determine what virtual device exists at specified address. If a virtual device exists at the address then the appropriate message is sent indicating which device emulator should be associated with the virtual device.

Virtual I/O devices increase flexibility and are highly suitable for many workloads, but may introduce unacceptable overheads for some I/O intensive workloads. I/O transactions are handled in a sequence of operations performed by the device emulator, protocol driver, and the host I/O driver so that the execution or software execution path-length—the time duration of software execution to accomplish the task—is significantly longer for virtual I/O than for a device driver which controls hardware directly. Furthermore, virtual I/O relies on emulation of a real device and thus limits the visibility of underlying I/O hardware to the virtual machine. The guest can only interact with devices for which a device emulator has been created. As new I/O technologies are introduced, handling that technology in a manner visible to a virtual machine becomes difficult.

Figure 4A:
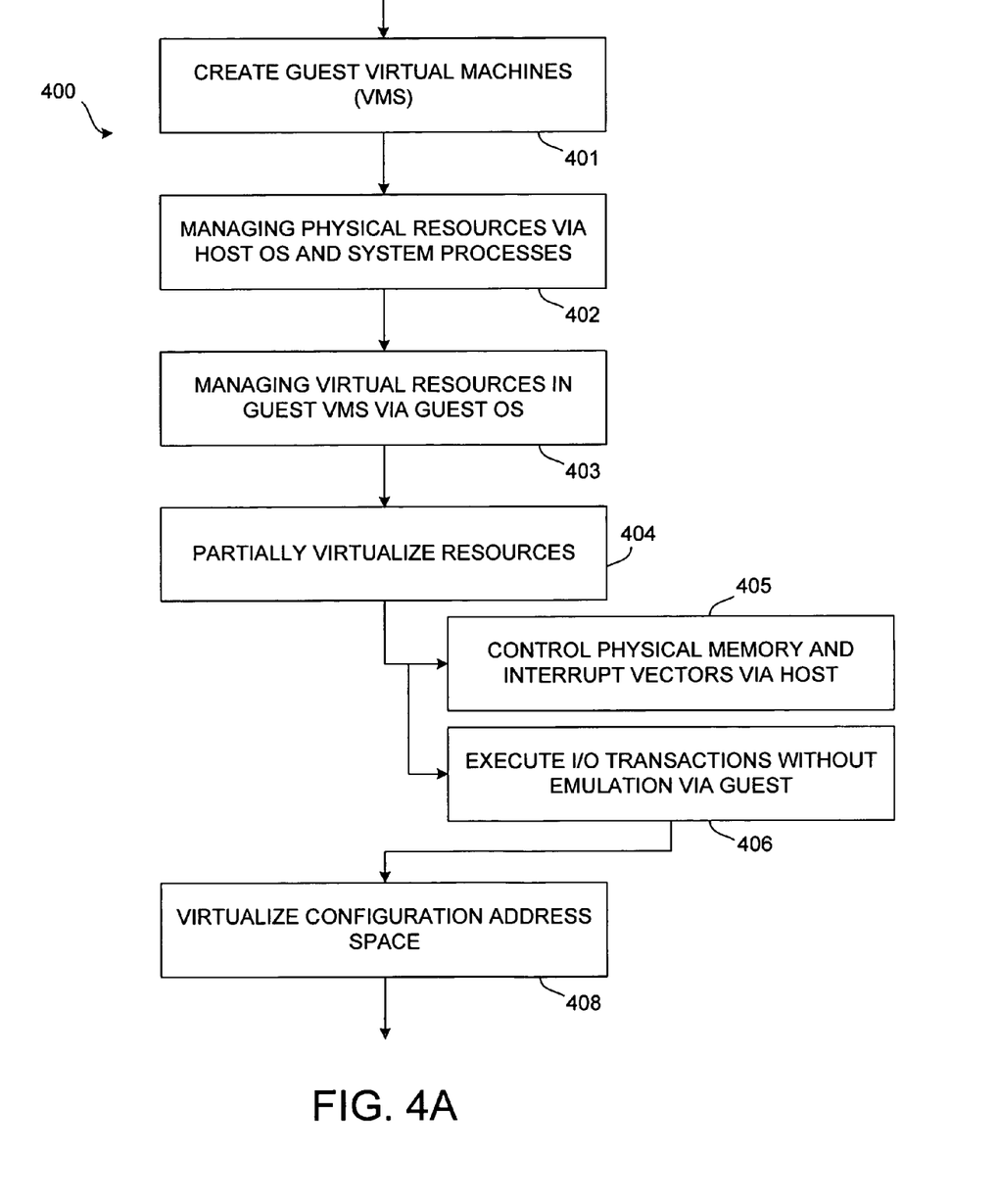
FIGS. 4A through 4E are schematic flow charts which depict an embodiment of a computing method for executing a direct I/O capability which enables virtual machines to directly control input/output devices.

Referring to FIG. 4A, a schematic flow chart depicts an embodiment of a computing method 400 for executing a direct I/O capability which enables virtual machines to directly control I/O devices. One or more guest virtual machines are created 401 which contain virtual computing resources that are not bound to physical computing resources whereby multiple guest virtual machines share a single set of physical computing resources. Managing 402 physical resources via operations of a host operating system and host system processes. Managing 403 virtual resources in a guest virtual machine via a guest operating system. Partially virtualizing 404 resources whereby the host operating system and host system processes completely control 405 resource allocation of physical memory and interrupt vectors while the guest operating system programs execute 406 I/O transactions without emulation. Virtualizing 408 PCI configuration address space so that one or more guest operating system controls PCI I/O devices directly and in absence of I/O emulation.

In some embodiments, interrupts can be generated using PCI Message Signaled Interrupts (MSI).

Figure 4B:
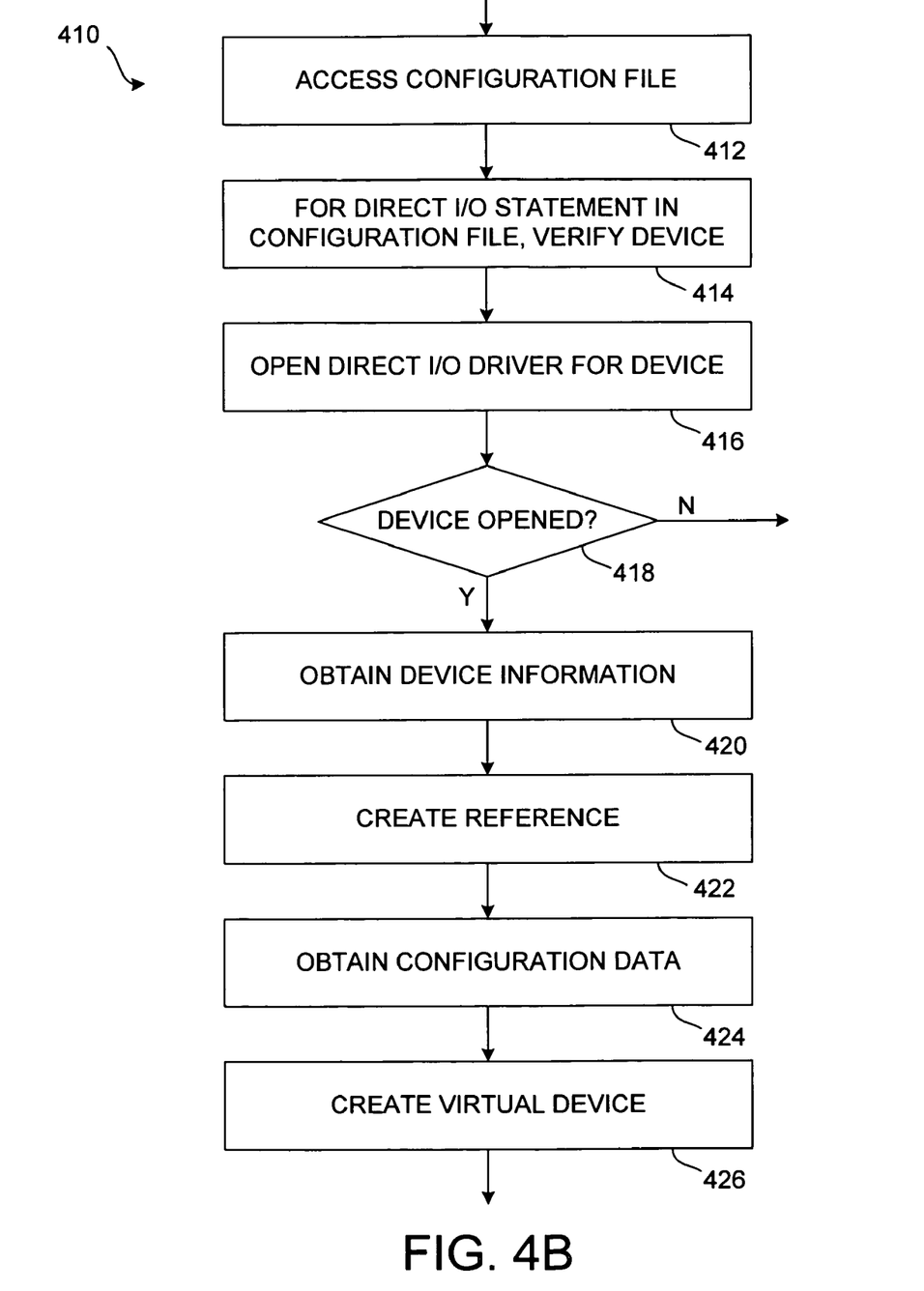

Referring to FIG. 4B, a schematic flow chart depicts an embodiment of an aspect the direct I/O computing method whereby a guest virtual machine attempts to perform a direct I/O transaction 410 by accessing 412 a configuration file, verifying 414 a device in response to a direct I/O statement in the configuration file, and opening 416 a direct I/O driver for the device. When the device is opened 418, device information is obtained 420 and a reference is created 422 on the device. PCI configuration data is obtained 424 and a virtual PCI device is created 426 using the obtained PCI configuration data.

Figure 4C:
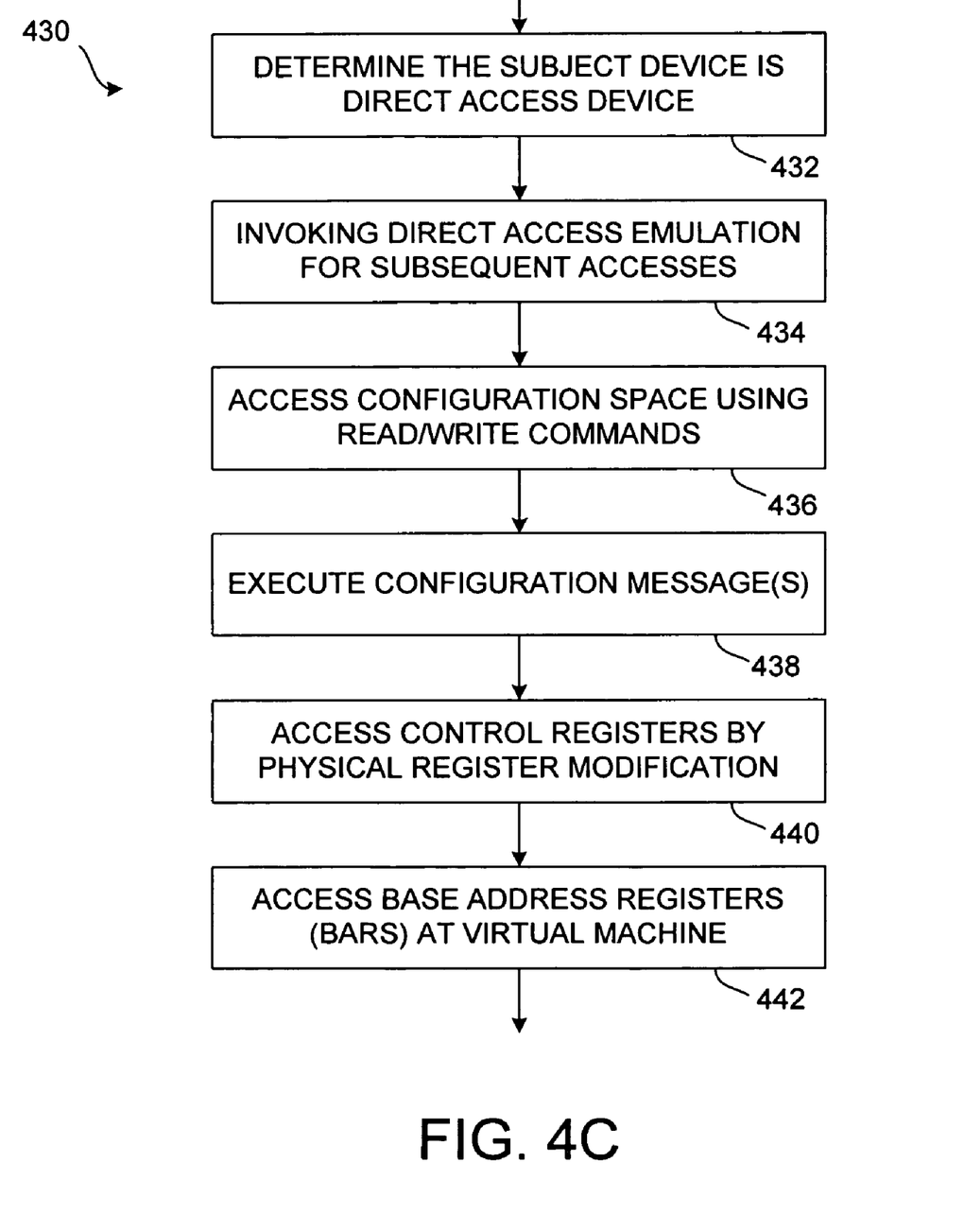

Referring to FIG. 4C, a schematic flow chart depicts an embodiment of an aspect the direct I/O computing method whereby the PCI configuration data is accessed 430 by determining 432 that a device subject to the PCI configuration access is a direct access device and invoking 434 direct access emulation for subsequent PCI configuration accesses. PCI configuration data is further accessed 430 at 436 PCI configuration space using PCI configuration read and write commands, and executing 438 PCI configuration messages. PCI configuration messages are executed 438 by accessing 440

PCI control registers by physical register modification and accessing 442 PCI Base Address Registers (BARs) by passage to a virtual machine application.

Figure 4D:
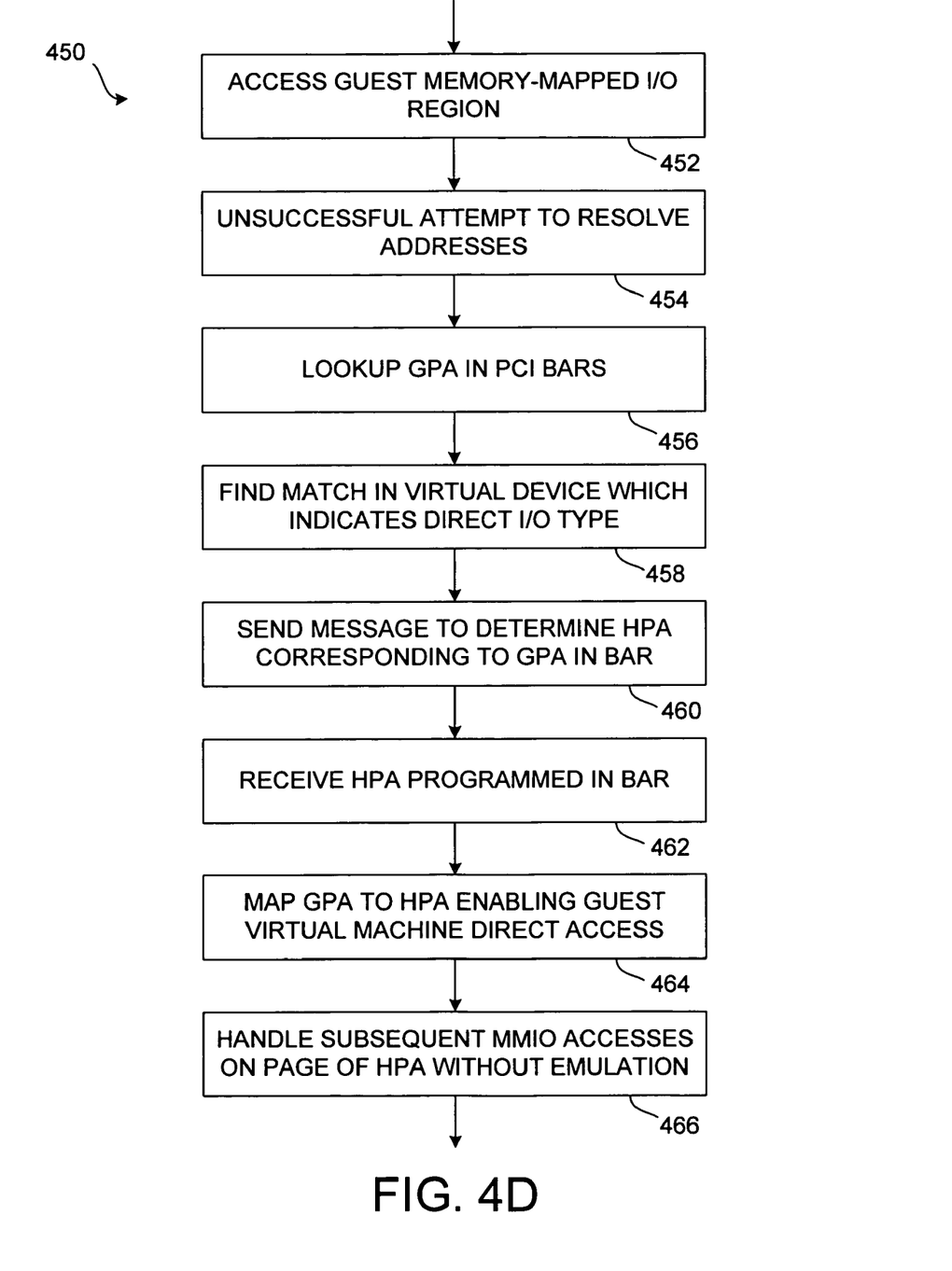

Referring to FIG. 4D, a schematic flow chart depicts an embodiment of an aspect the direct I/O computing method whereby a guest's memory-mapped I/O region that is mapped with a virtual base address register is accessed 450 by performing 452 a load or store instruction. VMM attempts 454 to resolve addresses, but is unsuccessful, so sends a message to the virtual machine application which looks up 456 a guest physical address in PCI base address registers, and finding 458 a match in a virtual PCI device which indicates a direct I/O type. The memory-mapped I/O port region is further accessed 450 by sending 460 a message to determine a host physical address corresponding to the guest physical address in the PCI BAR, receiving 462 a returned host physical address programmed in the PCI BAR, mapping 464 the guest physical address to the host physical address whereby the guest virtual machine can access the device directly, and handling 466 subsequent memory-mapped I/O accesses to a page of the host physical address without emulation.

Figure 4E:
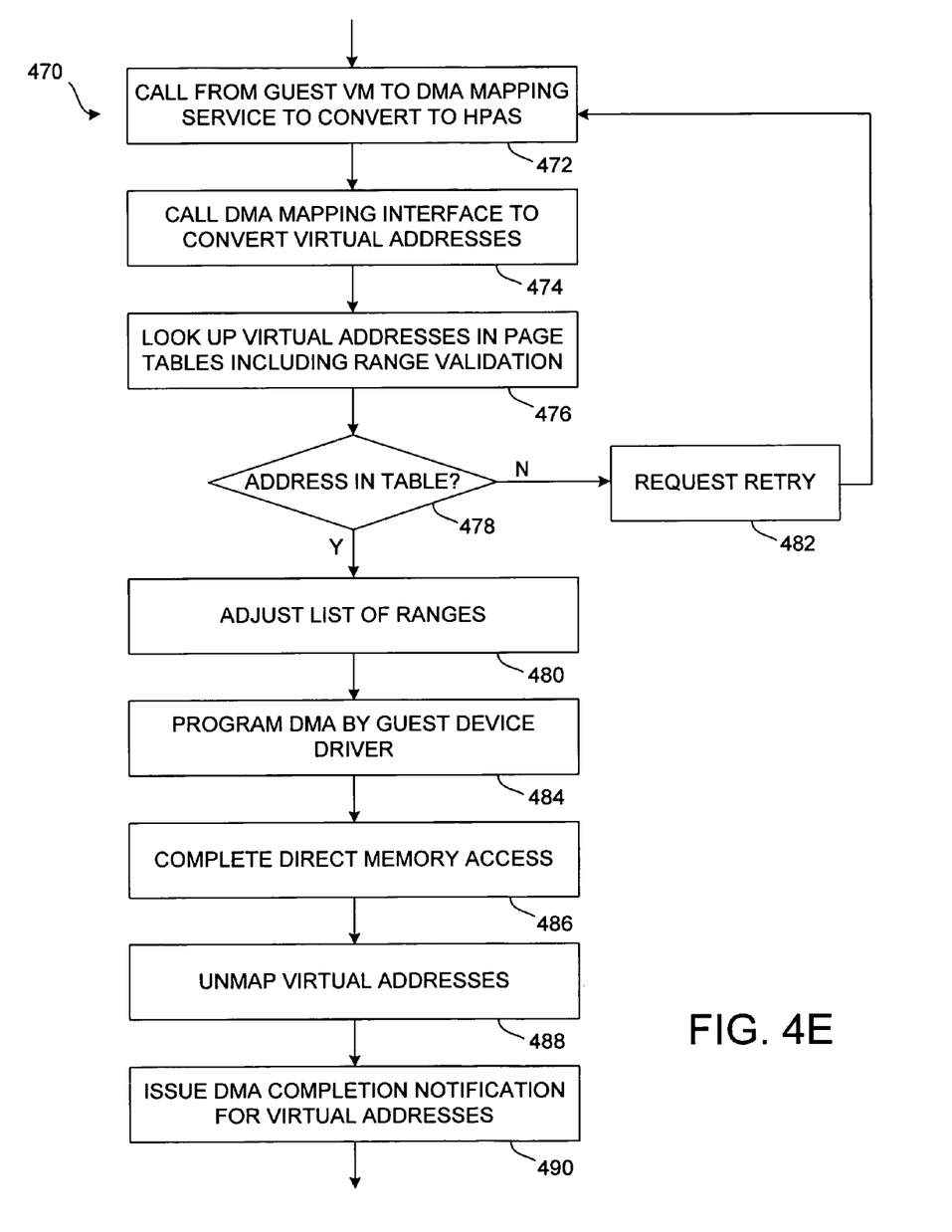

Referring to FIG. 4E, a schematic flow chart depicts an embodiment of an aspect the direct I/O computing method whereby a memory is accessed 470 via DMA by a direct I/O device by making 472 a call from a guest virtual machine to a DMA mapping service to convert virtual addresses to host physical addresses, calling 474 a DMA mapping interface to convert the virtual addresses, and looking up 476 the virtual addresses in page tables including validation of target address ranges. For virtual addresses found in the page tables 478, adjusting a returned list of ranges 480. For virtual addresses not found in the page tables 478, a retry is requested 482. The memory access 470 via DMA further comprises programming 484 the direct memory access via a guest device driver. Upon completion 486 of the DMA access, virtual addresses are unmapped 488 releasing any resources used to map the DMA, and a notification of DMA completion for the virtual addresses is issued 490.

In a particular operation, if the virtual address is not found in the page tables, a retry is requested 482. The retry causes the DMA mapping service to issue a sequence specifying guest physical addresses instead of virtual addresses. The VMM will return the host physical address range or ranges for the designated guest physical address range.

An illustrative embodiment of a direct I/O architecture implementation contains interface definitions for various Direct I/O modules and depicts an example event sequence for device configuration, PCI Configuration access, and interrupt delivery.

A user-space description of a Direct I/O can be specified in a virtual machine configuration file with the statement:

pci(pciBus,pciDev)=direct(directIoDevFile);

where pciBus specifies the PCI bus number in the guest, pciDev is the PCI device number in the guest, and directIoDevFile is the host device file for instance of a virtual machine direct input/output (vmdio) driver corresponding to the device.

For example, to map the guest PCI bus 0, device 4 to the hardware device which has been claimed by instance 7 of the vmdio driver in the host, the configuration file statement may be:

pci(0,4)=direct(/dev/vmdio7).

A command vmhwmgmt may be specified that dedicates host hardware for Direct I/O. The command syntax may be:

vmhwmgmt[-r|-u]-H hw_path-t hw_type;

where hw_path is a hardware path obtained via an I/O scan (ioscan) or other tools on a host, hw_type is the type of hardware to reserve. With no arguments vmhwmgmt prints a list of devices that are currently reserved in a format similar to the detailed output response of a virtual machine status request. Operations may reserve (-r) or unreserved (-u) the selected device. For a reserve operation vmhwmgmt may perform multiple tasks including verifying that hw_path specifies a valid device which can be used for Direct I/O, determining whether a PCI function is specified, determining capabilities such as message signaled interrupt support, verifying that the device is not currently in use for a critical system function, specifying in the system configuration that the vmdio driver will own the device, invoking the appropriate configuration utilities by specifying explicit driver binding information in the system file, and informing the user that the change will take effect after the host reboots. After host reboot, the hardware is controlled by the vmdio driver.

For an unreserve operation, vmhwmgmt performs multiple tasks including verifying that hw_path specifies a valid device which is under the control of the vmdio driver, removing explicit binding from the system file and invoking the appropriate kernel configuration utilities.

The vmdio driver claims devices in the host on behalf of guests and forwards device interrupts to the Direct I/O protocol driver. Virtual machine Direct I/O Driver (vmdio) may have a switch table interface whereby vmdio supports three character device switch table entry points including open, close, and ioctl. The vmdio_open entry point increments a reference count on the driver instance. A minor number contains the instance number. The vmdio_close entry point decrements a reference count on the driver instance and frees data structures associated with the instance. The vmdio_ioctl entry point supports several queries that are made by the virtual machine (VM) application or other tools. For example, VMDIO_HWPATH returns a string with the hardware path for the instance, VMDIO_GET_REGISTRATION_INFO returns a function pointer for vmdio_register which will be called by the Direct I/O protocol driver to register for callbacks, and VMDIO_GET_PCI_CONFIG returns 256 bytes of PCI configuration space. The BAR registers returned contain a mask indicating what is obtained by writing 0xFFFFFFFF to the registers and reading back responses, returning to the caller the size of the BARs but not the actual physical address programmed in the BAR.

Protocol driver registration can be made by a vmdio_register call. When the guest attempts to access the Direct I/O device for the first time, the DIO protocol driver (PD) attempts to connect to vmdio via the registration function obtained via ioctl(VMDIO_GET_REGISTRATION_INFO). A suitable function definition is:

```
int vmdio_register(dev_t dev, vmdioEvent_t event,
    vmdioCb_t cbFn, uint64_t cbArg);
``` where the event argument specifies an event type of the function. Valid events are VMDIO_INTERRUPT which calls the specified function on every interrupt (whenever vmdio_isr is called for the device), VMDIO_OLRAD_DELETE which calls the given function on an Online Deletion event for the device. The caller specifies a function pointer to call every time the event occurs for the associated device using the function definition:

void dioCallbackFunction(uint64_t cbArg).

On a successful VMDIO_INTERRUPT registration, vmdio_register enables the interrupt object to allow interrupts to be delivered for the device. If vmdio_register is called with NULL specified for the callback function, then the condition is considered a disconnection. For VMDIO_INTERRUPT disconnections, the interrupt object is disabled to inhibit interrupt deliveries when no driver is available to clear the interrupt condition. Return values for vmdio_register may include 0 to specify that successful registration, ENXIO to indicate a non-existent device whereby the designated minor number is not a valid vmdio device, EBUSY to indicate the device is already registered since direct I/O devices cannot be shared.

Interrupt handling is performed via vmdio_isr which is invoked when the associated device has asserted an interrupt and the host is the current owner of the Interruption Vector Table for the physical CPU. A callback function can be registered to handle the interrupt.

Direct I/O can be implemented in a Hewlett-Packard Unix (HP-UX) guest by using a virtual machine Direct Memory Access (DMA) Platform Service Module (PSM) which is invoked via standard driver interfaces to map buffers for DMA. Vmdma_psm self-initializes and obtains a function pointer used to register with the monitor from PCI configuration space. The PSM registers with the VMM Direct I/O emulator to enable devices to be reported to the guest. Thus, until the PSM is installed in the guest, the guest cannot interact with direct I/O devices.

The vmdma_psm enables Direct I/O by writing to the CONTROL register in Monitor Registration space. The registration function is called with the syntax:

```
typedef struct {
    void (*functionPtr)(uint64_t handle,. . .);
    uint64_t handle;
} vmInterface_t, *vmInterface_p;
vmInterface_t
vmRegistrationFunction(
    uint64_t registrationHandle,
    uint64_t pciConfigAddress,
    vmInterfaceType_t interfaceType);.
```

The DMA mapping interface of the monitor may be obtained by specifying "VM_DMA_MAP_INTERFACE" as the interfaceType and the appropriate guest PCI configuration address for the Direct I/O device, returning a new function pointer and handle which are used to perform DMA mapping operations. The interface allows one or more virtual or guest-physical addresses to be converted into addresses which can be used to program DMA in the physical device. The interface may be defined as follows:

```
int
vm_dma_map(
    uint64_t    vm_dma_map_handle,   //obtained via registration
    int         sge_count,            //num of scatter-gather entries
    vm_sge_p    guest_sge_list,       //list of SGEs
    int         host_sge_count,       //num of entries in host_sge_list
    vm_sge_p    host_sge_list)        //OUT: list of host SGEs
```

Scatter-Gather list entries can be described by a vm_sge_t structure:

```
typedef struct {
    uint64_t isVirtual :1;    // 1=virtual address, 0=physical address
    uint64_t address :63;     // address (61-bit offset if virtual)
    uint64_t regionId :24;    // region ID (0 if physical)
    uint64_t size :32;        // size of SGE
    uint64_t reserved :8;     // reserved (must be 0)
} vm_sge_t, *vm_sge_p;
```

Valid return values from vm_dma_map can be greater than zero to specify the number of SGEs remaining to be processed, zero to indicate a successful operation, code VM_DMA_INVALID_ADDRESS to indicate specification of a bad address, code VM_DMA_INVALID_ARGUMENT to indicate a bad argument such as an invalid attribute, code VM_DMA_NO_VIRTUAL_MAPPING to indicate the input virtual address cannot be converted, typically because the virtual machine monitor does not have the virtual to guest physical address translation.

The direct I/O device interface may also include a DMA UNMAP Interface. The Direct I/O emulator may also exports an unmap interface which is used to indicate to the monitor that the buffer is no longer in use for direct memory access. The unmap interface is obtained by specifying VM_DMA_UNMAP_INTERFACE as the interfaceType and the appropriate guest PCI configuration address for the Direct I/O device, returning a new function pointer and handle which are used to perform DMA mapping operations. The unmap interface may be specified as follows:

```
int
vm_dma_unmap(
    uint64_t vm_dma_map_handle,   // obtained via registration
    int host_sge_count,            // num of entries in host_sge_list
    vm_sge_p host_sge_list)        // list of host SGEs.
```

The valid return values from vm_dma_unmap are a value greater than zero to designate the number of SGEs remaining to be processed, zero to indicate a successful operation, a code VM_DMA_INVALID_ADDRESS to indicate that a bad address is specified, and a code VM_DMA_INVALID_ARGUMENT to indicate a bad argument such as an invalid attribute.

PCI has three address spaces including memory-mapped input-output for normal register operations, I/O ports to enable a legacy technique for interacting with I/O devices, and configuration space to set up addresses to which a device responds including functioning as a device master on DMA transfers on the bus. The Direct I/O Emulator (DIO emulator) is responsible for all Direct I/O functionality in the virtual machine monitor and includes PCI Configuration Emulation, Memory-Mapped I/O initialization, DMA mapping services, and interrupt emulation. PCI Configuration Emulation is attained by registering the functions DioPciConfigRead and DioPciConfigWrite with the PCI configuration emulator at guest initialization time via a call to MonAddGenProtoDriver. All PCI configuration accesses from the guest are thus handled by the DIO Emulator. For example, DioPciConfig Read can send a DIO_PCI_CONFIG_READ message to emulate the PCI configuration space read. DioPciConfigWrite sends a DIO_PCI_CONFIG_WRITE message to emulate the PCI configuration space write. Most operations in the PCI configuration access are performed in the Direct I/O Protocol Driver. Some embodiments may include monitor support for some PCI registers such as virtual MSI registers which are managed separately from the hardware MSI registers.

Memory-Mapped I/O initialization may be activated by the following entry in the VmmDriverTable, causing each instance of the DIO Emulator to be initialized on the first access to Memory-mapped IO space defined in the virtual BAR registers:

{ioDIRECT, 0, 0, NULL, dioDestroyInstance, dioInitInstance}, where dioInitInstance initializes data structures associated with the instance of the emulator and dioDestroyInstance dismantles structures initialized by dioInitInstance. DioInitInstance performs tasks including sending a DIO_MAP message to obtain the host physical address that corresponds to the specified guest address, creating a page table entry (PTE) to map the specified guest address to the host physical address, creating structures used for the DMA mapping services, and sending a DIO_ASYNC_EVENT message to initialize the asynchronous event mechanism for the instance. The function dioInterruptAsyncEvent is specified as the handler for interrupt events.

The Direct I/O Emulator can implement the DMA mapping services.

Interrupt Emulation can be performed using a dioInterruptAsyncEvent function which is called via the asynchronous event mechanism when an interrupt event has been detected either by the Direct I/O protocol driver or by the virtual machine monitor interrupt handler. DioInterrupt AsyncEvent invokes the emulation software for the interrupt controller to cause the interrupt to be delivered to the guest.

The Direct I/O Protocol Driver (DIO PD) may be responsible for much of the PCI configuration space emulation. The Direct I/O protocol driver can forward interrupts received by the vmdio driver to the monitor and resets the device on guest termination, and can respond to messages from the DIO Emulator and to callbacks registered with the vmdio driver.

The direct I/O protocol driver handles guest termination and device reset. When a guest is terminated, a device close interface can be called for each DIO device.

The direct I/O protocol driver may also support reset via a device-specific algorithm. The Direct I/O protocol driver maintains a table containing a reset function for all devices that have a device-specific reset function defined. The PCI vendor identifier (ID) and device ID are used to look up the device. A function which is found can then be called with the PCI configuration address to perform the function level reset. On call return, the device is guaranteed to be in a quiescent state and ready to be re-opened as a direct I/O device, typically in an un-initialized state.

The direct I/O protocol driver can also support reset via PCI power management extensions. If no device-specific reset function is defined, then the architected reset is performed using the PCI power management extensions. Devices have either a reset function or support PCI power management.

The direct I/O protocol driver can support an interrupt callback. When the vmdio driver calls the function registered to handle interrupt events, the direct I/O protocol sends a message to the VMM to notify of an asynchronous event.

The direct I/O protocol driver can support a DIO_MAP message that can be sent by the VMM to determine the host physical address programmed in a specific PCI Configuration BAR. The virtual BAR registers have a one-to-one correspondence with the physical BAR registers. Upon receipt of a DIO_MAP message, the direct I/O protocol driver simply reads the corresponding BAR register from the physical register and returns the result.

The direct I/O protocol driver can support DIO_PCI_CONFIG_READ and DIO_PCI_CONFIG_WRITE messages. Specific handling of PCI Configuration space depends on which register is accessed. In some cases, the physical PCI configuration registers are accessed, for example PCI Status. In other cases, the access is passed to VM application via a PCI_CONFIG_READ/WRITE message for emulation, for example PCI BAR registers.

The direct I/O protocol driver can support architected PCI Configuration Header Registers. In general, registers that contain static information such as Vendor and Device ID registers are handled by sending a PCI_CONFIG_READ/WRITE message to the VM application. Some registers can be accessed simultaneously.

The direct I/O protocol driver can support PCI Extended Capabilities. PCI Configuration space architecture has been extended in recent years by the addition of architected capabilities. The capabilities are reported via a list of Capability registers pointed to by the "Capabilities pointer" at offset 52 in the configuration header. Each capability structure in PCI configuration space contains a "Capability ID" and a pointer to the next element in the list.

Capabilities reported by the Direct I/O device may or may not be visible to the guest. Various PCI capabilities are handled in a virtual machine. None of the currently-defined capabilities require the guest to modify the settings of the hardware.

The direct I/O protocol driver can support device-specific PCI Configuration Registers. Some devices have PCI configuration space registers that are not defined in any of the PCI architecture documents. The default behavior for such registers is to send a PCI_CONFIG_READ/WRITE message without modifying the hardware version of the registers.

The Direct I/O configuration module (DIO CM) can be a module in VM application that is responsible for handling the configuration file statements associated with Direct I/O. The main entry point may be UsrDirectIo( ) which performs the following tasks including opening the specified Direct I/O device file, if the open fails printing diagnostic information while retaining the guest boot without failure, obtaining the configuration function pointer for later use via ioctl (VMDIO_GET_REGISTRATION_INFO), obtaining the current PCI Configuration state for the device via ioctl(VMDIO_GET_PCI_CONFIG), and initializing the virtual PCI Configuration via UsrPciSetFtn for the specified PCI bus/dev/ftn.

When the guest first attempts to access memory-mapped IO space for the direct I/O device, the BAR lookup code in the PCI protocol driver determines a match and calls IoemDirect IoInit which formats the MAP_VIRTUAL_IO response message to indicate a Direct I/O device.

Interactions between Direct I/O Modules are executed through several event sequences for various Direct I/O activities including pre-guest boot initialization, PCI configuration access, memory-mapped I/O access, direct memory access, interrupt delivery, PCI online replacement/addition/deletion, and error handling.

For pre-guest boot initialization, some preliminary configuration takes place in preparation for a guest attempt to use direct I/O before the guest begins executing. When a direct IO statement is encountered in the configuration file, the direct I/O is invoked to verify the corresponding device. The direct I/O configuration module opens the vmdio driver to obtain some information and to create a reference on the device in case there is a host initiated PCI Online Removal/Addition/Deletion (OLRAD) event. If the open fails, then a diagnostic message is logged and the direct I/O device will not be visible to the guest. The direct I/O configuration module creates the virtual PCI device using PCI configuration data obtained via an ioctl call to the virtual machine direct I/O driver (vmdio).

For a PCI Configuration Access, the first interactions the guest has with the direct I/O device are PCI Configuration accesses. In an example of a general sequence of events, on the first PCI configuration access the PCI configuration emulator in the monitor discovers that the device is type ioDIRECT and invokes the DIO emulator for subsequent PCI Configuration accesses. The DIO emulator uses DIO_PCI_CONFIG_READ and DIO_PCI_CONFIG_WRITE messages to access PCI Configuration space. The DIO_PCI_CONFIG* messages are handled by the direct I/O protocol driver. Some registers, such as PCI Control, are handled by modifying the physical registers. Some registers, such as PCI BARs, are handled by passing to VM application via PCI_CONFIG_READ and PCI_CONFIG_WRITE messages. Some registers, such as Message Signaled Interrupt registers, require additional emulation in the monitor. Some registers, for example device-specific configuration registers, are handled by device-specific codes in the direct I/O protocol driver.

For a memory-mapped I/O access, on a first access to a Memory-mapped or I/O Port region that is mapped with a BAR, a sequence of events comprises an access. A guest accesses address space and a monitor attempts to resolve address by sending a MAP_VIRTUAL_IO message to the host. The message is handled in VM application that looks up the guest physical address in the virtual PCI BARs. The VM application finds a match in the virtual PCI device which indicates that the device is a direct I/O device, returning information in the MAP_VIRTUAL_IO_RESULT message. The monitor sends a DIO_MAP message to determine the physical address corresponding to the BAR. The direct I/O protocol driver returns the host physical address programmed in the physical BAR. The monitor creates a page table entry (PTE) which maps the guest address to the host physical address so the guest can access the device directly. Subsequent MMIO accesses to the page occur without emulation.

For a direct memory access, DMA programming on a device is inherently device-specific, but involves multiple common steps in the Direct I/O environment. The guest calls a DMA mapping service to convert virtual addresses to I/O virtual (normally physical) addresses. For Direct I/O devices, the call invokes vmdma_psm to convert the virtual address to a host physical address. The vmdma_psm calls the DIO emulator's DMA mapping interface to convert the address. The DIO emulator looks up the virtual addresses in the page tables. The emulator validates the target addresses by checking the ranges. If the emulator finds the virtual addresses, the emulator adjusts the returned list of ranges as appropriate and returns success. If the virtual address lookup fails for any of the virtual addresses, then the direct I/O emulator returns VM_DMA_NO_VIRTUAL_MAPPING to indicate that the caller should retry the translation using guest physical addresses whereby vmdma_psm obtains the guest-physical addresses and then calls the direct I/O emulator. The guest device driver can then program the direct memory access. When the direct memory access is complete, the vmdma_psm may be invoked again to unmap the buffers. The vmdma_psm calls the direct I/O emulator's direct memory access unmap interface to notify the monitor that direct memory access is complete for the buffer.

For interrupt delivery, direct I/O for devices uses PCI Message Signaled Interrupts (MSIs). PCI is architected to use level-triggered interrupts whereby the interrupt condition is to be cleared during the initial invocation of the driver's interrupt service routine. If the condition is not cleared, then the interrupt is reasserted by the hardware when the end of interrupt (EOI) message is sent. The vmdio driver does not have information about the specifics of the PCI devices and cannot clear the interrupt condition. Therefore, level-triggered interrupts result in a lack of forward progress on the target physical processor unless a device-specific interrupt handler is defined to acknowledge the interrupt before forwarding to the guest.

For a hardware interrupt asserted while the host controls the physical central processing unit (PCPU), a sequence of events occurs to forward an interrupt to the guest for a direct I/O device that asserts an interrupt while the host is in control of the physical CPU. The interrupt is delivered to the processor and the host operating system detects the external interrupt and invokes the interrupt service routine, which may be vmdio_isr for all direct I/O devices. Vmdio_isr calls the registered interrupt handler in the direct I/O protocol driver. The direct I/O protocol driver calls DeliverAsyncEvent( ) to notify the monitor of the pending interrupt. The monitor handles the asynchronous event by invoking the direct I/O emulator's asynchronous event handler. The direct I/O emulator calls the interrupt controller emulation software to assert the interrupt in the guest.

For a hardware interrupt while virtual machine monitor owns PCPU, a sequence of events occurs to forward an interrupt to the guest for a direct I/O device that asserts an interrupt while the host is in control of the physical CPU. The interrupt is delivered to the processor. The monitor detects XiExtInt and determines that the interrupt vector corresponds to a direct I/O device. If the appropriate guest context is currently in place, the asynchronous event handler is called directly. Otherwise the asynchronous event is posted for the target guest and handled when a guest virtual CPU becomes active. If no virtual CPUs in the guest are active, then a message is sent to the host to activate one of the virtual CPUs. The direct I/O emulator calls IosAssert( ) to assert the interrupt in the guest.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer system comprising:
a physical computer;
a virtual machine monitor executable on the physical computer and configured to create an emulation of at least one guest operating system adapted to control the physical computer, the virtual machine monitor comprising:
  a Peripheral Communication Interconnect (PCI) configuration emulator that calls a function registered by a corresponding device emulator to manage configuration space accesses or forwards a configuration space access to a PCI configuration driver for unregistered or selectively non-emulated functions;
  a direct input/output (I/O) emulator that manages direct I/O functionality in the virtual machine monitor; and
  an input/output discovery emulator that determines whether an I/O device exists at an address corresponding to a guest access at a physical address that does not correspond to memory by sending a message to a virtual I/O map driver in the host; and
a host executable on the physical computer that manages physical resources coupled to the physical computer on behalf of the virtual machine monitor and the at least one guest operating system, the host adapted to virtualize a Peripheral Component Interconnect (PCI) configuration address space whereby the at least one guest operating system controls PCI input/output (I/O) devices directly and in absence of I/O emulation for memory-mapped I/O registers and I/O port registers, and emulates accesses to configuration space.

2. The computer system according to claim 1 further comprising:
a guest operating system comprising:
  a guest device driver configured to control particular PCI devices; and
  a direct memory access (DMA) mapping driver that makes system calls to the virtual machine monitor to convert guest physical addresses to host physical addresses for a selected direct memory access and exports DMA mapping services used by guest device drivers to convert guest-physical address ranges to host-physical address ranges.

3. The computer system according to claim 2 further comprising:
the DMA mapping driver configured to allocate ranges of memory whereby the ranges are contiguous for guest physical address and associated host physical address.

4. The computer system according to claim 1 further comprising:
a plurality of guest operating systems configured whereby different functions of a multifunction PCI card are allocated to different guest operating systems.

5. The computer system according to claim 1 further comprising:
the host comprising:
  a Peripheral Communication Interconnect (PCI) configuration driver that tracks PCI configuration state for individual hardware devices and manages message signaled interrupt (MSI) configuration;
  a direct I/O protocol driver configured to perform an interrupt service that forwards an external interrupt to the guest operating system using parameters set by the guest operating system; and
  a virtual I/O map driver configured to associate a device emulator with a virtual device.

6. The computer system according to claim 5 further comprising:
the host further comprising:
  a direct I/O protocol driver that claims physical devices in the host operating system on behalf of the guest operating systems and forwards physical device interrupts to the direct I/O protocol driver.

7. The computer system according to claim 6 further comprising:
the direct I/O driver that self-registers on a PCI attach list, enabling a claim to any PCI device, and initializes an interrupt for the claimed physical device to invoke the direct I/O driver for any interrupt generated by the claimed physical device.

8. The computer system according to claim 5 further comprising:
the host further comprising:
  a direct I/O configuration module that manages a user-space portion of device configuration including validating configuration file information and guest physical address space to PCI Configuration Base Address Register (BAR) conversion.

9. The computer system according to claim 8 further comprising:
the direct I/O configuration module that manages configuration file statements associated with a direct I/O functionality including actions of opening a specified direct I/O device file, obtaining a configuration function pointer, obtaining current PCI configuration state for the specified physical device, and initializing a virtual PCI configuration.

10. The computer system according to claim 5 further comprising:

the direct I/O protocol driver configured to manage PCI configuration space emulation, forward interrupts from a physical hardware device to the PCI configuration emulator in the virtual machine monitor, and reset the physical hardware device on guest termination by PCI power management extensions.

11. The computer system according to claim 5 further comprising:

the direct I/O protocol driver configured to manage PCI configuration space emulation, forward interrupts from a physical hardware device to the PCI configuration emulator in the virtual machine monitor, and reset the physical hardware device on guest termination by a device-specific code whereby the direct I/O protocol driver maintains a reset function table for all devices with a defined device-specific reset function using PCI vendor identifier and device identifier as lookup parameters for determining a PCI configuration address that is used to perform a function level reset.

12. The computer system according to claim 1 further comprising:

the direct I/O emulator configured to manage all PCI configuration accesses from the guest operating system including implementing a DMA map interface and exporting an unmap interface used to indicate to the virtual machine that a buffer is no longer in use for direct memory access.

\* \* \* \* \*